United States Patent Office 3,398,189
Patented Aug. 20, 1968

3,398,189
PHOSPHORIMIDIC TRIAMIDE SALTS
Harold F. Wilson, Moorestown, N.J., and Robert L. Skiles, Warminster, Pa., assignors to Rohm & Haas Company, Philadelphia, Pa., a corporation of Delaware
No Drawing. Continuation of application Ser. No. 293,868, July 9, 1963. This application May 10, 1965, Ser. No. 454,694
10 Claims. (Cl. 260—551)

This application is a continuation of U.S. application Serial No. 293,868, filed July 9, 1963, and now abandoned.

This invention is concerned with phosphorimidic triamide salts as new compounds and processes for preparing them. Additionally, this invention relates to the use of these novel organic phosphorus compounds in pest control.

The phosphorimidic triamide salts may be represented by the general formula $$(RNH)_4P \cdot X$$

wherein R is at least one member of the group consisting of alkyl groups of 1 to 18 carbon atoms, alkenyl groups of 3 to 12 carbon atoms and cycloalkyl groups of 5 to 6 carbon atoms, and X is a salt-forming anion, such as borate, bromide, chloride, fluoborate, iodide, nitrate, phosphate, sulfates, acetate, carbonates, oxalate, phthalate, carbamates, dithiocarbamates, sulfonates, thioxanthates, xanthates and polycarboxylate. By the term polycarboxylate is meant the anion derived from polycarboxylic acids such as polyacrylic and polymethacrylic acids and acid formed by copolymerization. Suitable copolymeric structures include those made by copolymerizing lower alkyl acrylates and methacrylates, such as butyl acrylate or methyl methacrylate, with copolymerizable unsaturated aliphatic acids, such as acrylic acid, methacrylic acid, α-methylene-glutaric acid, and β-methacryloxypropionic acid. The anions are preferably chosen on the basis that they do not contribute to phytotoxicity to plant foliage, i.e. that they are agronomically acceptable.

The basic phosphorimidic triamides may be represented by the formula $$(RNH)_3P=NR$$

wherein R is as defined above. The phosphorimidic triamides and their salts represented by the above formulas are new chemical structures, which are readily prepared from available raw materials. They are biologically active and are particularly useful as fungicides.

It is known that primary amines of the formula, $RNH_2$, where R is a phenyl or a benzyl group, will react with phosphorus pentachloride to form phosphorimidic triamide hydrochlorides. This literature is reviewed in G. M. Kosolapoff's book, "Organophosphorus Compounds," John Wiley & Sons, 1950, pages 325–332. Such compounds have not, however, attained commercial usefulness. It has now been found that phosphorimidic triamide hydrochlorides formed from wholly aliphatic amines possess unusual fungicidal activity with a very low degree of phytotoxicity to growing plants.

(A) Phosphorimidic triamide hydrochlorides
$((RNH)_4P \cdot Cl)$

These new phosphorimidic triamide hydrochlorides can be prepared by reacting aliphatic primary amines or their hydrochlorides with phosphorus pentachloride under anhydrous conditions, usually in the presence of an inert solvent. When primary amines $(RNH_2)$ or their hydrochlorides react with phosphorus pentachloride, a number of types of products can result, such as $$RNHPCl_4, \quad RN=PCl_3$$

and their dimers, $(RNH)_2PCl_3$, $(RNH)_3PCl_2$, $$(RNH)_4PCl$$

and $(RNH)_3P=NR$. Three of the chlorine atoms of $PCl_5$ are easily replaced by RNH groups, the fourth with much more difficulty and the fifth may not be replaced by this procedure.

Reactions giving phosphorimidic triamide hydrochlorides may be represented by:

(1)  $8RNH_2 + PCl_5 \rightarrow (RNH)_4P \cdot Cl + RNH_2 \cdot HCl$
(2)  $4RNH_2 + PCl_5 \rightarrow (RNH)_4P \cdot Cl + 4HCl$
(3)  $4RNH_2 \cdot HCl + PCl_5 \rightarrow (RNH)_4P \cdot Cl + 8HCl$ wherein R has the significance given above. As prepared by the above reactions, the R groups in $(RNH)_4P \cdot Cl$ are the same, and these symmetrical phosphorimidic triamide salts are preferred. The corresponding bromides may be prepared from phosphorus pentabromide.

The aliphatic primary amines used for these preparations are alkylamines wherein the alkyl group contains 1 to 18 carbon atoms, alkenylamines having 3 to 12 carbon atoms and cyclopentyl and cyclohexylamines. Substituent groups which are reactive with phosphorus pentachloride, such as hydroxy, mercapto, carboxyl and carboxyl derivatives, should not be present in the alkyl, alkenyl or cycloalkyl groups. Suitable alkylamines are, for example, methylamine, ethylamine, isopropylamine, sec-butylamine, t-butylamine, 1,1,3,3-tetramethylbutylamine (also known as t-octylamine), dodecylamine and octadecylamine. Alkyl primary amines having alkyl groups with more than 18 carbon atoms give too sluggish a reaction to be practical. Suitable alkenylamines useful for these preparations include allylamine, methallylamine and 5,5,7,7 - tetramethyl - 2 - octenylamine. The amines should be in an anhydrous state.

The mole ratio of the reactants may vary from 4 to 25 moles of the amine or its hydrochloride per mole of phosphorus pentachloride. The preferred moles of amine per mole of $PCl_5$ are 8 to 16.

An acid acceptor is usually employed in the reactions and preferably this is an excess of the amine reactant as depicted in Equation 1; however, other basic acid acceptors which are inert under the reaction conditions, such as triethylamine, pyridine, and the like, may be used. When no acid acceptor is used, the HCl is normally volatilized out of the reaction mixture.

Under conditions where sufficient fluidity is maintained to allow stirring, the reaction may be run in the absence of a solvent. It is preferred, however, to have an anhydrous, inert solvent present. Solvents which are suitable may be found in the ether, hydrocarbon, chlorinated hydrocarbon, etc. classes. Suitable solvents, for example, are diethyl ether and higher ethers, benzene, toluene, xylene and carbon tetrachloride. An excess of the amine used as the reactant may serve as a solvent.

A range of reaction temperatures can be employed. The lower limit is just above the freezing point of the reaction mixture since it is important to maintain a fluid state. The upper limit is the boiling point, particularly when solvents are employed. It is preferred to employ a reaction temperature in the range of about 20° to 140° C. The reaction may be carried out in stages:

(1) Addition of $PCl_5$ to the amine solution, in which case the exothermic reaction often encountered is controlled by cooling, usually below about 60° C.;

(2) Stirring the reaction mixture at room temperature, from a period of an hour to several days, and (3) Completing the reaction by stirring at elevated temperature, often at the reflux temperature of the solvent, for a limited period of time, such as up to two days.

The products may be isolated by conventional means, such as filtration, or from a solution in the reaction medium by removal of the solvent by distillation or evaporation under reduced pressure. The products may be purified by the usual means, such as by washing with appropriate solvents or by recrystallization.

Infrared analysis was found to be very useful for characterization of these phosphorimidic triamide hydrochlorides. Characteristic absorptions include a medium to strong band at 3.12–3.22$\mu$, a strong band at 6.8–7.1$\mu$, a strong band, which is sometimes a doublet, at 8.89–9.13$\mu$, and a weak to strong band at 10.6–11.5$\mu$.

The following examples merely illustrate the invention and are not to be construed as limiting. Parts are by weight unless otherwise designated.

Example 1.—Preparation of N,N′,N″,N‴ - tetrakis-(methyl)phosphorimidic triamide hydrochloride
$((CH_3NH)_4P \cdot Cl)$ A 2-liter, 3-necked flask outfitted with a stirrer, thermometer, Dry-Ice condenser and gas-addition tube is charged with 570 parts of dry benzene. With cooling controlled in the range of 16° to 22° C., methylamine gas is introduced under the surface of the benzene until a total of 71 parts (2.3 moles) is dissolved. While methylamine is still being passed in, phosphorus pentachloride (41.6 parts, 0.2 mole) is added over a period of about two hours with cooling at 15° to 18° C. The reaction mixture is stirred at room temperature for 48 hours and then on a steam bath for four hours. The resulting solid is filtered off, washed with ether, and then with a saturated salt solution to remove as much as possible of the methylamine hydrochloride by-product. The residue is slurried with hot absolute alcohol and the alcohol filtrate is concentrated to give 10 parts of a solid which is recrystallized from absolute alcohol. This filtrate, upon concentration, gives a white solid melting at 153° to 155° C. This contains by analysis 25.54% C, 9.28% H, 19.96% Cl, 29.33% N, and 16.30% P; calculated values for $C_4H_{16}ClN_4P$ are 25.74% C, 8.64% H, 19.00% Cl, 30.02% N and 16.60% P. The product is a 17% yield of N,N′,N″,N‴-tetrakis(methyl)-phosphorimidic triamide hydrochloride.

Example 2.—Preparation of N,N′,N″,N‴ - tetra(ethyl)-phosphorimidic triamide hydrochloride
$((C_2H_5NH)_4P \cdot Cl)$ A solution of 100 parts (2.22 moles) of ethylamine in 270 parts of dry benzene is placed in a 2-liter, 3-necked flask fitted with a condenser, stirrer, thermometer and powder funnel. To this, phosphorus pentachloride (31.2 parts, 0.15 mole) is added over a period of 75 minutes with the temperature controlled at 12° to 15° C. The mixture is stirred overnight at room temperature, then on a steam bath for two hours. The reaction mixture is cooled to room temperature. The solid present is filtered off and slurried with 100 parts of saturated salt solution to which is added 3 parts of water. The residual solid is filtered off and dried. The solid is then slurried with absolute alcohol and filtered. The filtrate, upon cooling, gives a white solid melting at 168° to 170° C. Further crops of solid are obtained from the filtrate, giving a total of 14.5 parts. This solid contains by analysis 39.53% C, 10.04% H, 14.55% Cl, 22.88% N, and 16.61% P; calculated values for $C_8H_{24}ClN_4P$ are 39.58% C, 9.96% H, 14.61% Cl, 23.08% N and 12.76% P. The product is a 40% yield of N,N′,-N″,N‴ - tetrakis(ethyl)phosphorimidic triamide hydrochloride.

Example 3.—Preparation of N,N′,N″,N‴-tetrakis(allyl)-phosphorimidic triamide hydrochloride
$((CH_2{=}CHCH_2NH)_4P \cdot Cl)$ Into a 2-liter, 3-necked flask fitted with a stirrer, thermometer, condenser and powder funnel are placed 171 parts (3.0 moles) of allylamine and 270 parts of dry benzene. With stirring and slight cooling, phosphorus pentachloride (41.6 parts, 0.2 mole) is added over a period of one hour. The mixture is stirred at room temperature for four days. The solid product is removed by filtration and recrystallized from 50 parts of water to give 14.1 parts of white solid. More solid is obtained from the filtrate. A second recrystallization from water gives a white solid melting at 133° to 135° C. A total of 14 parts is isolated. The solid contains by analysis 49.54% C, 8.44% H, 11.93% Cl, 18.98% N and 10.77% P; calculated values for $C_{12}H_{24}ClN_4P$ are 49.56% C, 8.32% H, 12.20% Cl, 19.27% N and 10.65% P. The product is a 24% yield of N,N′,N″,N‴-tetrakis(allyl)phosphorimidic triamide hydrochloride.

Example 4.—Preparation of N,N′,N″,N‴-tetrakis(isopropyl)phosphorimidic triamide hydrochloride ((iso-$C_3H_7NH)_4P \cdot Cl$)

A 2-liter, 4-necked flask fitted with a stirrer, thermometer, condenser and powder funnel is charged with a solution of 295 parts (5.0 moles) of isopropylamine in 270 parts of dry toluene. To this, phosphorus pentachloride (41.6 parts, 0.2 mole) is added with stirring at about 25° C. over a period of 30 minutes. The reaction slurry is stirred at room temperature for sixteen hours and then on a steam bath for four hours. It is then cooled, the solid removed by filtration, washed with ether and dried to give 107 parts. The solid is washed with 50 parts of ice water and a second time with 100 parts of ice water, filtered and dried to give 20.5 parts of white solid melting at 186° to 190° C. Another 5.0 parts of solid melting at 178° to 180° C. is recovered from the filtrate, giving a total yield of 25.5 parts. This solid contains by analysis 48.33% C, 10.90% H, 12.04% Cl, 18.77% N and 10.20% P; calculated values for $C_{12}H_{32}(ClN_4P)$ are 48.22% C, 10.79% H, 11.87% Cl, 18.75% N and 10.37% P. The product is a 43% yield of N,N′,N″,N‴ - tetrakis(isopropyl)phosphorimidic triamide hydrochloride.

Example 5.—Preparation of N,N′,N″,N‴-tetrakis(n-butyl)phosphorimidic triamide hydrochloride
$((C_4H_9NH)_4P \cdot Cl)$ To a solution of 146 parts (2 moles) of freshly dried and distilled n-butylamine in 175 parts of dry benzene is added phosphorus pentachloride (45.7 parts, 0.22 mole) in four portions with stirring and cooling in an ice bath. Efficient cooling is necessary, as the reaction is quite exothermic. A colorless solid separates slowly. The mixture is stirred at room temperature for two hours, then at reflux temperature for forty-eight hours. The reaction mixture is cooled to room temperature, filtered and the residue washed with ether and dried to give 102 parts of colorless solid. The filtrate is concentrated to dryness and the residue triturated with ether to give another 16 parts of colorless solid. The combined solids are washed with water to give 20 parts of a product melting at 97° to 98° C. This solid, on recrystallization from a benzene-hexane mixture, gives 17 parts of white solid melting at 98° to 99° C. This solid contains by analysis 54.22% C, 11.65% H, 10.18% Cl and 8.44% P; calculated values for

are 54.14% C, 11.36% H, 9.99% Cl and 8.73% P. The product is a 23% yield of N, N', N", N'''-tetrakis (n-butyl)phosphorimidic triamide hydrochloride.

Example 6.—Preparation of N,N',N",N'''-tetrakis(t-butyl)phosphorimidic triamide hydrochloride ((t-C₄H₉NH)₄P·Cl)

Into a 1.5 liter flask is placed t-butylamine (350 parts, 4.8 moles). To this, phosphorus pentachloride (25 parts, 0.12 mole) is slowly added with stirring. An exothermic reaction and fuming occur and the reaction is moderated with cooling in an ice bath. A paste gradually forms and is allowed to stand overnight. The paste is washed with ether and the solid residue filtered and dried to give 90 parts. The solid is then slurried in boiling ether, followed by slurrying in boiling benzene to give a solid residue. This product, upon washing with an ether-methanol solution, gives 10.5 parts of solid which has a melting point greater than 300° C. It contains by analysis 10.03% Cl, 15.75% N and 8.67% P; calculated values for

are 9.99% Cl, 15.78% N and 8.73% P. The solid is a 25% yield of N,N',N",N'''-tetrakis(t-butyl)phosphorimidic triamide hydrochloride.

Example 7.—Preparation of N,N',N",N'''-tetrakis(n-octyl)phosphorimidic triamide hydrochloride ((C₈H₁₇NH)₄P·Cl)

A 1-liter, 3-necked flask outfitted with stirrer, condenser and thermometer is charged with 103 parts (0.8 mole) of dry-n-octylamine dissolved in 270 parts of dry benzene. With stirring, phosphorus pentachloride (20.85 parts, 0.1 mole) is added portionwise so that the temperature does not go above 60° C. After all is added and the temperature starts to fall, the mixture is stirred at reflux temperature overnight. A solution results. To the cooled solution is added hexane to give a white solid which is filtered and washed with hexane to give 58 parts. The solid melts at 67° to 68° C. It contains by analysis 6.23% Cl, 9.58% N and 5.45% P; calculated values for

are 6.12% Cl, 9.66% N and 5.35% P. The white solid is a quantitative yield of N,N',N",N'''-tetrakis(n-octyl)-phosphorimidic triamide hydrochloride.

Example 8.—Preparation of N,N',N",N'''-tetrakis(1,1,-3,3-tetramethylbutyl)-phosphorimidic triamide hydrochloride ((t-C₈H₁₇NH)₄P·Cl)

To a stirred solution of 980 parts (7.58 moles) of 1,1,3,3-tetramethylbutylamine in 1750 parts of dry xylene is added slowly 200 parts (0.96 mole) of phosphorus pentachloride. The reaction temperature is kept below 65° C. by cooling with an ice bath. When the initial exotherm has subsided, the mixture is stirred and heated to reflux for five hours. The mixture is cooled and a solid separates which is isolated by filtration. The solid is then slurried with dilute hydrochloride acid, filtered and washed with water and hexane. After air-drying, the solid is 350 parts and melts at 248° to 250° C. with decomposition. It may be further purified by recrystallization from alcohol followed by washing with ether to give a white solid melting at 252° to 253° C. The solid contains by analysis 66.57% C, 12.68% H, 6.34% Cl, 9.84% N and 5.54% P; calculated values for C₃₂H₂ClN₄P are 66.33% C, 12.53% H, 6.12% Cl, 9.66% N and 5.35% P. The product is a 63% yield of N,N',N",N'''-tetrakis-(1,1,3,3-tetramethylbutyl)phosphorimidic triamide hydrochloride.

Example 9.—Preparation of N,N',N",N'''-tetrakis(dodecyl)phosphorimidic triamide hydrochloride ((C₁₂H₂₅NH)₄P·Cl)

A solution of 200 parts (1.08 mole) of dodecylamine in 880 parts of benzene is charged to a 2-liter, 3-necked flask fitted with a stirrer, thermometer, condenser and addition funnel. To this, phosphorus pentachloride (27 parts, 0.13 mole) is added over a period of thirty minutes, with stirring and cooling so that the temperature remains in the range of 4° to 16° C. A thick slurry results. It is stirred at room temperature for about one hour, then allowed to stand overnight. The slurry is then heated on a steam bath to reflux temperature for two days and gives a solution. The solution is cooled in an ice bath to precipitate a solid which is removed by filtration. The residue is washed with ether and then with 2000 parts of water by slurrying. The residue is recrystallized from alcohol twice to give 26 parts of white solid melting at 75° to 78° C. This melting point is subject to considerable variations, depending on conditions. The solid contains by analysis 71.77% C, 13.29% H, 3.28% Cl, 6.83% N and 3.69% P; calculated values for C₄₈H₁₀₄ClN₄P are 71.72% C, 13.03% H, 4.41% Cl, 6.97% N and 3.85% P. The solid is a 25% yield of N,N',N",N'''-tetrakis(dodecyl)phosphorimidic triamide hydrochloride.

Example 10.—Preparation of N,N',N",N'''-tetrakis(octadecyl)phosphorimidic triamide hydrochloride ((C₁₈H₃₇NH)₄P·Cl)

To a stirred solution of 108 parts (0.4 mole) of octadecylamine in 350 parts of toluene, phosphorus pentachloride (10.4 parts, 0.05 mole) is added over a period of thirty minutes, while maintaining the reaction temperature at 45° to 55° C. The mixture is stirred at room temperature for one hour and then heated on a steam bath for two hours. A clear yellow-orange solution results. Upon cooling to room temperature, the mixture sets to a waxy solid and is warmed to 50° C. and filtered. The residue is washed with benzene, then with methanol. The combined filtrates, on cooling, give 13 parts of a tan solid melting at 80° to 85° C. The solid is recrystallized from a benzene-ethanol mixture and then from benzene to give 2.8 parts of solid melting at 91° to 92° C. The solid contains by analysis 76.37% C, 12.80% H, 3.22% Cl, 4.94% N and 2.96% P; calculated values for C₇₂H₁₄₂ClN₄P are 76.56% C, 12.60% H, 3.13% Cl, 4.96% N and 2.74% P. The product is a 5% yield of N,N',N",N'''-tetrakis(octadecyl)phophorimidic triamide hydrochloride.

Example 11.—Preparation of N,N',N",N'''-tetrakis(cyclohexyl)phosphorimidic triamide hydrochloride ((C₆H₁₁NH)₄P·Cl)

A solution of 160 parts (1.68 moles) of cyclohexylamine in 866 parts of toluene is charged to a two-liter, three-necked flask fitted with a stirrer, thermometer, condenser and additional funnel. To this is added phosphorous pentachloride (43.7 parts, 0.21 mole), over a prieod of fifty minutes, with cooling at 0° to 10° C. The reaction mixture is heated on a steam bath and becomes thick. Additional toluene (215 parts) is added to facilitate stirring, after which the mixture is stirred at reflux temperature for sixteen hours. The reaction mixture is cooled and the solid product removed by filtration and washed with ether. When the solid is washed with water, there is obtained 31.5 parts of white solid melting at 263° C. From the original toluene filtrate there may be isolated an additional 11 parts of the same solid. The solid may be recrystallized from benzene. It may also be purified by dissolving in a minimum of ethanol, cooling to give a solid which is removed by filtration and adding water to the filtrate to give solid, which is then isolated and dried and is found to melt at 264° C. This solid contains by analysis 63.13% C, 10.67% H, 7.60% Cl, 11.60% N and 6.60% P; calculated values for $C_{24}H_{48}ClN_4P$ are 62.78% C, 10.54% H, 7.23% Cl, 12.20% N and 6.74% P. The product is a 44% yield of N,N',N",N'''-tetrakis(cyclohexyl)phosphorimidic triamide hydrochloride.

In the same manner, an equivalent quantity of cyclopentylamine may be substituted for the cyclohexylamine above to produce N,N',N",N'''-tetrakis(cyclopentyl)phosphorimidic triamide hydrochloride.

Unsymmetrical $(RNH)_3(R'NH)PCl$ compounds wherein R' has the same meaning as R, given above, may be made by the following reaction, as illustrated in Equation 4:

(4) $(RNH)_3PCl_2 + 2R'NH_2 \rightarrow$
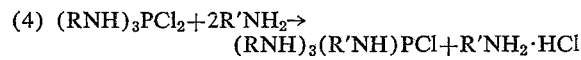
$(RNH)_3(R'NH)PCl + R'NH_2 \cdot HCl$ The reaction conditions are the same as given above for the symmetrical compounds $(RNH)_4PCl$. The $(RNH)_3PCl_2$ starting compounds used in Equation 4 may be made, for example, by reaction of phosphoric triamides with acid chlorides, such as phosgene or oxalyl chloride, or with phosphorus pentachloride as in Equation 5:

(5) $(RNH)_3PO + PCl_5 \rightarrow (RNH)_3PCl_2 + POCl_2$
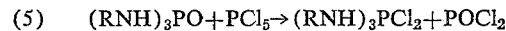

The $(RNH)_3PO$ used in Equation 5 may be made by reaction of the amine, $RNH_2$, with $POCl_3$, as in Equation 6:

(6) $6RNH_2 + POCl_3 \rightarrow (RNH)_3PO + 3RNH_2 \cdot HCl$
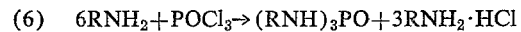

Example 12.—Preparation of N-1,1,3,3-tetramethylbutyl-N',N",N''' - tris - (t - butyl)phosphorimidic triamide hydrochloride $((t-C_8H_{17}NH)(t-C_4H_9NH)_3P \cdot Cl)$ (a) Preparation of N,N',N"-tris(t-butyl)phosphoric triamide.—A solution of 146 parts (2 moles) of t-butylamine in 260 parts of anhydrous toluene is stirred while phosphorus oxychloride (45.9 parts, 0.3 mole) is added dropwise with cooling in an ice bath over a period of one-half hour. The mixture is then stirred at room temperature for one hour and then on a steam bath for sixteen hours. It is cooled and filtered. The residue is washed with benzene and then with ether to give 144 parts of a colorless solid. The solid is washed with water to remove t-butylamine hydrochloride and dried to give 48.4 parts of colorless solid melting at 238° to 242° C. A sample crystallized from acetone melts at 243° to 244° C., which contains by analysis 54.84% C, 11.56% H, 15.83% N and 11.20% P; calculated values for $C_{12}H_{30}N_3OP$ are 54.71% C, 11.48% H, 15.95% N and 11.76% P. The product is a 61% yield of N,N',N"-tris(t-butyl)-phosphoric triamide.

(b) Preparation of chloro-N,N',N"-tris(t-butyl)phosphorimidic diamide hydrochloride.—To a suspension of 35 parts (0.133 mole) of N,N',N"-tris(t-butyl)phosphoric triamine in 156 parts of dry toluene is added powdered phosphorus pentachloride (27.6 parts, 0.133 mole) in two portions. There is a mild exotherm. The reaction mixture is stirred at room temperature for one-half hour. It is cooled and filtered. The solid residue is washed with benzene and with ether to give 37 parts of a powdery, colorless solid melting at greater than 300° C. It may be recrystallized from hot acetone. The infrared spectrum of the recrystallized material is identical to that of the crude product. It contains by analysis 45.45% C, 9.65% H, 13.22% N, 22.17% Cl and 9.44% P; calculated values for $C_{12}H_{30}Cl_2N_3P$ are 45.28% C, 9.50% H, 13.20% N, 22.28% Cl and 9.73% P. The product is an 87% yield of chloro-N,N',N"-tris(t-butyl)phosphorimidic diamide hydrochloride.

(c) Preparation of N-1,1,3,3-tetramethylbutyl-N',N",N''' - tris(t - butyl)phosphorimidic triamide hydrochloride.—There is charged to a 300 ml., 3-necked flask, fitted with a stirrer, thermometer, condenser and addition funnel, a suspension of 20 parts (0.063 mole) of chloro-N,N',N"-tris-(t-butyl) phosphorimidic diamide hydrochloride in 65 parts of dry toluene. To this is added, over a period of five minutes, t-octylamine (16.5 parts, 0.126 mole). The reaction mixture is heated on a steam bath for two days, then cooled and filtered. The toluene filtrate is concentrated to give a gummy solid, which is slurried with 5% of hydrochloric acid and refiltered. The residue is purified by dissolving in methanol and adding water to precipitate 11 parts of white solid melting with decomposition at 250° C. Another 3 parts is obtained from the filtrate. The solid contains by analysis 58.21% C, 11.51% H, 8.96% Cl, 13.32% N and 7.55% P; calculated values for $C_{20}H_{48}ClN_4P$ are 58.45% C, 11.79% H, 8.62% Cl, 13.63% N and 7.53% P. The product is a 54% yield of N-1,1,3,3-tetramethylbutyl-N',N",N'''-tris(t-butyl)phosphorimidic triamide hydrochloride.

Example 13.—Preparation of N-allyl-N',N",N'''-tris(t-butyl)phosphorimidic triamide hydrochloride $((CH_2=CHCH_2NH)(t-C_4H_9NH)_3P \cdot Cl)$ To a suspension of 20 parts (0.063 mole) of chloro-N,N',N"-tris(t-butyl)phosphorimidic diamide hydrochloride in 48 parts of dry toluene is added allylamine (3.5 parts, 0.063 mole). Heat is evolved. The mixture is stirred on a steam bath for two hours. The reaction mixture is filtered and the residue washed with ether, then with water, to give 12 parts of insoluble white solid. This is recrystallized from water to give 4.8 parts of white solid which melts at greater than 300° C. This solid contains by analysis 53.05% C, 11.16% H, 10.45% Cl, 16.47% N and 9.00% P; calculated values for $C_{15}H_{36}ClN_4P$ are 53.16% C, 10.96% H, 10.46% Cl, 16.53% N and 9.14% P. This product is a 50% yield of N-allyl-N',N",N'''-tris(t-butyl)phosphorimidic triamide hydrochloride.

Example 14.—Preparation of N-cyclohexyl-N',N",N'''-tris(t - butyl)phosphorimidic triamide hydrochloride $((C_6H_{11}NH)(t-C_4H_9NH)_3P \cdot Cl)$ Cyclohexylamine (12.5 parts, 0.126 mole) is added to a mixture of 20 parts (0.063 mole) of chloro-N,N',N"-tris(t-butyl)phosphorimidic diamide hydrochloride in 65 parts of dry toluene. The reaction is very exothermic. The mixture is stirred at room temperature for two hours and an additional 48 parts of dry toluene is added to facilitate stirring. The slurry is heated on a steam bath for sixteen hours and the insoluble solid removed by filtration. The toluene filtrate is concentrated to give 21.5 parts of off-white solid melting with decomposition at 267° to 270° C. It contains by analysis 56.67% C, 11.07% H, 9.50% Cl, 14.38% N and 8.22% P; calculated values for $C_{18}H_{42}ClN_4P$ are 56.75% C, 11.11% H, 9.30% Cl, 14.71% N and 8.13% P. It is a 90% yield of N-cyclohexyl-N',N",N''' - tris(t-butyl)phosphorimidic triamide hydrochloride.

Example 15.—Preparation of N-n-butyl-N,N",N'''-tris(t-butyl phosphorimidic triamide hydrochloride $((C_4H_9NH)(t-C_4H_9NH)_3P \cdot Cl)$ To a suspension of 10 parts (0.0315 mole) of chlor-N,N',N"-tris(t-butyl)phosphorimidic diamide hydrochloride in 50 parts of dry benzene is added 6.9 parts (0.0945 mole) of n-butylamine. There is an exotherm. The mixture is heated on a steam bath for two and one-half hours and then concentrated to give 16 parts of solid. This product is washed with water, filtered and dried to give 10 parts of crude product. This is recrystallized from a benzene-hexane mixture to give 7.5 parts of a colorless solid, which melts at 278° C. with decomposition. This solid contains by analysis 54.23% C, 11.21% H, 9.70% Cl, 15.46% N and 8.63% P; calculated values for $C_{16}H_{40}ClN_4P$ are 54.14% C, 11.35% H, 9.98% Cl, 15.78% N and 8.72% P. The product is a 67% yield of N-n-butyl-N',N",N''' - tris(t - butyl)phosphorimidic triamide hydrochloride.

(B) Phosphorimidic triamide salts other than hydrochlorides

Phosphorimidic triamide salts other than the hydrochlorides, i.e., $(RNH)_4P \cdot X$ wherein X is a salt-forming anion other than Cl, may be prepared in at least four ways:

(a) Neutralization of the phosphorimidic triamide base with an acid, exemplified in Equation 7:

(7) $(RNH)_3P=NR + HX \rightarrow (RNH)_4P \cdot X$

Equivalent quantities of the two reactants are used. An inert solvent, such as water, alcohols, ketones and nitromethane, is usually employed, but the reaction may be run in the absence of a solvent. Temperatures employed are usually in the range of $-20°$ to $50°$ C., with the preferred temperature being that of the room, about $18°$ to $25°$ C.

(b) By metathesis of phosphorimidic triamide hydrochlorides with metallic salts, as depicted in Equation 8:

(8) $(RNH)_4PCl + Metal\ X \rightarrow (RNH)_4P \cdot X + Metal\ Cl$

Any metallic salt which has sufficient solubility to react may be used. Commonly used salts are those derived from the alkali metals, alkaline earth metals, silver and lead. Solvents are usually employed—water, alcohols and ketones being the most common. Reaction temperatures may be varied from $0°$ to $100°$ C., with a preferred range of $20°$ to $50°$ C.

(c) By reaction of the phosphorimidic triamide base with water and a salt, such as potassium iodide, as in Equation 9:

(9) $(RNH)_3P=NR + H_2O + KI \rightarrow (RNH)_4P \cdot I + KOH$

This process is useful when the solubility of the salt is such that it readily precipitates from the basic reaction mixture.

(d) By reaction of the phosphorimidic triamide hydrochlorides with an acid as in Equation 10:

(10) $(RNH)_4PCl + HX \rightarrow (RNH)_4P \cdot X + HCl$

Any inert solvent is usually employed. Suitable solvents are water, alcohols and ketones. Reaction temperatures are in the range of $0°$ to $50°$ C., but those most often employed are $15°$ to $35°$ C. This method of preparation is most often used when the salt desired is less soluble in the reaction solvent than the starting hydrochloride.

The salts may be named as salts of the phosphorimidic triamide base, as has been done with the hydrohalides, or as phosphonium salts.

The following examples illustrate the preparation of these phosphorimidic triamide salts.

Example 16.—Preparation of N,N',N'',N'''-tetrakis(1,1,3,3-tetramethylbutylamino)phosphonium acetate ((t-$C_8H_{17}NH)_4P \cdot OCOCH_3$)

(a) Preparation of N,N',N'',N'''-tetrakis(1,1,3,3-tetramethylbutyl)phosphorimidic triamide.—To a stirred solution of 27 parts (0.0465 mole) of N,N',N'',N'''-tetrakis-(1,1,3,3-tetramethylbutyl)phosphorimidic triamide hydrochloride in 160 parts of anhydrous ethanol at reflux temperature is added an alcoholic solution of sodium ethoxide prepared by adding 1.5 parts (0.065 atom) of sodium to 80 parts of anhydrous ethanol. Stirring is continued for three hours after the solution cools to room temperature. The alcohol is removed by distillation and the residue dissolved in ether and filtered to remove salt. The ether is removed from the filtrate to give 20 parts of a yellow oil. This contains by analysis 68.1% C, 13.1% H, 10.03% N, 5.70% P and no Cl; calculated values for $C_{32}H_{71}N_4P$ are 68.3% C, 13.07% H, 10.3% N and 5.73% P. The molecular weight, as determined osmometrically, is 542 and the calculated value is 542.9. The product is an 80% yield of N,N',N'',N''' - tetrakis(1,1,3,3 - tetramethylbutyl)phosphorimidic triamide.

In another preparation, N,N',N'',N'''-tetrakis(1,1,3,3-tetramethylbutyl)phosphorimidic triamide hydrochloride, suspended in toluene, is reacted with three equivalents of sodium hydride as a 48% suspension in mineral oil for sixteen hours on a steam bath. A yellow oil is isolated which, by infrared analysis, has been found to be identical to the above product.

(b) Preparation of N,N',N'',N'''-tetrakis(1,1,3,3-tetramethylbutylamino)phosphonium acetate.—Glacial acetic acid (1.7 parts, 0.028 mole) is added to a solution of 10 parts (0.0184 mole) of N,N',N'',N'''-tetrakis-(1,1,3,3-tetramethylbutyl)phosphorimidic triamide in 43 parts of dry benzene. The solution is stirred with slight warming for one hour and concentrated under reduced pressure to give a gummy solid. To this is added acetone (50 parts) and the mixture is concentrated to one-half volume and filtered. The solid residue is washed with acetone and dried to give 3.7 parts of colorless solid melting at $159°$ to $160°$ C. This contains by analysis 68.04% C, 12.35% H, 9.18% N and 4.91% P; calculated values for $C_{34}H_{25}N_4O_2P$ are 67.72% C, 12.54% H, 9.29% N and 5.13% P. This is a 33% yield of N,N',N'',N'''-tetrakis-(1,1,3,3-tetramethylbutylamino)phosphorium acetate.

The same compound is made by refluxing a suspension of 10 parts (0.0173 mole) of N,N',N'',N'''-tetrakis(1,1,3,3-tetramethylbutyl)phosphorimidic triamide hydrochloride in 100 parts of 50:50 aqueous ethanol with 2.9 parts (0.0173 mole) of silver acetate for twenty-four hours. The reaction mixture is cooled and filtered and the filtrate concentrated to dryness to give 9 parts of colorless solid. The product is purified by washing with acetone, then by taking up in methanol and precipitating with water to give 6 parts of purified solid. This is a 58% yield of N,N',N'',N''' - tetrakis(1,1,3,3 - tetramethylbutylamino)phosphonium acetate.

Example 17.—Preparation of N,N',N'',N'''-tetrakis(1,1,3,3-tetramethylbutylamino)phosphonium acid oxalate ((t-$C_8H_{17}NH)_4P \cdot OCOCOOH$)

To a solution of 10 parts (0.0184 mole) of N,N',N'',N''' -tetrakis(1,1,3,3 - tetramethylbutyl)phosphorimidic triamide in 43 parts of benzene is added oxalic acid dihydrate (1.2 parts, 0.0092 mole) and the mixture is stirred magnetically for one-half hour. A solid forms and is filtered off, slurried with water, refiltered and dried. The product is 8.5 parts of a colorless solid melting with decomposition at $106°$ to $118°$ C. An analytical sample is obtained by recrystallization from water and has a melting point of $113°$ to $117°$ C. This contains by analysis 65.22% C, 11.98% H, 8.93% N and 4.91% P; calculated values for $C_{34}H_{73}N_4O_4P$ are 64.51% C, 11.63% H, 8.85% N and 4.89% P. The product is a 73% yield of N,N',N'',N''' - tetrakis(1,1,3,3 - tetramethylbutylamino) phosphonium acid oxalate.

Example 18.—Preparation of N,N',N'',N'''-tetrakis(1,1,3,3 - tetramethylbutylamino)phosphonium sulfate ($[(t-C_8H_{17}NH)_4P]_2 \cdot SO_4$)

To a solution of 10 parts (0.0184 mole) of N,N',N'', N''' - tetrakis(1,1,3,3 - tetramethylbutylamino)phosporimidic triamide in 40 parts of ethanol is added a solution of 0.88 part (0.009 mole) of sulfuric acid in 10 parts of water. The reaction is exothermic and the temperature rises to $50°$ C. The reaction mixture is concentrated to dryness to give an oily solid. This is redissolved in a small volume of ethanol and cooled to give a solid which, after vacuum drying at $60°$ C. for sixteen hours, is 0.45 part, melting at $94°$ to $96°$ C., of an analytical sample. The filtrate is concentrated to dryness and triturated with ether to give 7.9 parts of a solvated, powdery, colorless solid, melting at $125°$ to $130°$ C. An analytical sample contains by analysis 9.31% N, 5.29% P and 2.52% S;

calculated values for $C_{64}H_{144}N_8O_4P_2S$ are 9.45% N, 5.23% P and 2.71% S. The product is a 75% yield of N,N',N",N'"-tetrakis(1,1,3,3-tetramethylbutylamino)phosphonium sulfate.

Example 19.—Preparation of N,N',N",N'" - tetrakis-(1,1,3,3 - tetramethylbutylamino)phosphonium nitrate $((t\text{-}C_8H_{17}NH)_4P \cdot NO_3)$ To a solution of 20 parts (0.0346 mole) of N,N',N",N'"- -tetrakis(1,1,3,3 - tetramethylbutyl)phosphorimidic triamide hydrochloride in 80 parts of methanol is added a solution of 5.87 parts (0.0346 mole) of silver nitrate in 20 parts of water. The reaction is mildly exothermic and silver chloride is precipitated almost immediately. The mixture is filtered and the filtrate is partially concentrated to give a crystalline solid which, after washing with aqueous methanol, leaves 10.9 parts of solid melting at 156° to 158° C. More product can be isolated from the combined filtrate and washing. The solid contains by anlysis 63.44% C, 12.08% H, 11.30% N and 4.98% P; calculated values for $C_{32}N_{72}N_5O_3P$ are 63.35% C, 11.99% H, 11.57% N and 5.12% P. The product is a 52% yield of N,N',N",N'"-tetrakis(1,1,3,3-tetramethylbutylamino)phosphonium nitrate.

Example 20.—Preparation of N,N',N",N'"-tetrakis(t-butyl)phosphorimidic triamide hydroiodide $((t\text{-}C_4H_9NH)_4 \cdot PI)$ (a) Preparation of N,N',N",N'"-tetraki(t-butyl)phosphorimidic triamide.—To a suspension of 20 parts (0.0564 mole) of N,N',N",N'" - tetrakis(t-butyl)phosphorimidic triamide hydrochloride in 80 parts of freshly dried and distilled t-butyl alcohol is added potassium t-butoxide (6.7 parts, 0.06 mole). The mixture is stirred at room temperature for six hours, then at reflux temperature for five hours. After standing forty-eight hours at room temperature, the mixture is filtered and the residue washed with dry ether. The filtrate, upon concentration, gives 15.6 parts of a yellow solid melting at 52° to 53° C. It may be sublimed on a steam bath at 0.5 mm. pressure to give a colorless solid melting at 53° to 55° C. This contains by anlysis 60.32% C, 12.57% H, 17.86% N and 9.69% P; calculated values for $C_{16}N_{39}N_4P$ are 60.34% C, 12.34% H, 17.59% N and 9.73% P. This is an 87% yield of N,N',N",N'"-tetrakis(t-butyl)phosphorimidic triamide.

The molecular weight as determined by the elevation of the boiling point of ethylene dichloride is found to be 333±5; the calculated value is 318.5.

(b) Preparation of N,N',N",N'"-tetrakis(t-butyl)phosphorimidic triamide hydroiodide.—To a solution of 6.2 parts (0.02 mole) of N,N',N",N'"-tetrakis(t-butyl)phosphorimidic triamide in a mixture of 25 parts of methanol and 10 parts of water is added a solution of 3.32 parts (0.02 mole) of potassium iodide in 20 parts of water. A mild exothermic results, raising the temperature to 40° C., and a colorless solid is precipitated instantly. The product is filtered off, washed with aqueous methanol and dried to give 7.5 parts of solid which has a melting point above 300° C. It contains by analysis 43.19% C, 9.13% H, 12.20% N, 7.20% P and 28.10% N; calculated values for $C_{16}H_{40}IN_4P$ are 43.05% C, 9.03% H, 12.55% N, 6.95% P and 28.42% I. The product is an 86% yield of N,N',N",N'"-tetrakis(t-butyl)phosphorimidic triamide hydroiodide.

Other salts made by the general methods described above as Equations 7 and 8 include the following:

Example 21.—N,N',N",N'"-tetrakis(1,1,3,3-tetramethylbutylamino)phosphonium tetrafluoroborate, melting at 130° to 131° C. after recrystallization from hexane.

Example 22.—N,N',N",N'"-tetrakis(1,1,3,3-tetramethylbutylamino)phosphonium dimethylcarbamate, melting at 93° to 95° C.

Example 23.—N,N',N",N'"-tetrakis(1,1,3,3-tetramethylbutylamino)phosphonium methylcarbonate, which after trituration with acetone melted at 175° to 185° C. (dec.).

Example 24.—N,N',N",N'"-tetrakis(1,1,3,3-tetramethylbutylamino)phosphonium carbamate which after trituration with ether melted at 56° to 59° C. (dec.).

Example 25.—N,N',N",N'"-tetrakis(1,1,3,3-tetramethylbutylamino)phosphonium N - (1,1,3,3-tetramethyl)-dithiocarbamate, which after triturating with ether melted at 113° to 143° C. (dec.).

Example 26.—N,N',N",N'"-tetrakis(1,1,3,3-tetramethlbutylamino) - phosphonium dimethyldithiocarbamate, melting at 175° to 176° C. recrystallization from aqueous methanol.

Example 27.—Bis - (N,N',N",N'"-tetrakis(1,1,3,3-tetramethylbutylamino)phosphonium) ethylenebisdithiocarbamate, which after trituration with ether melted at 131° to 141° C. (dec.).

Example 28.—N,N',N",N'"-tetrakis(1,1,3,3-tetramethylbutylamino) - phosphonium poly-α-methylstyrenesulfonate, which was isolated as an amorphous solid.

Example 29.—N,N',N",N'"-tetrakis(1,1,3,3-tetramethylbuylamino)phosphonium benzylthioxanthate, which after trituration with water melted at 83° to 93° C. (dec.).

Example 30.—Bis - (N,N',N",N'" - tetrakis(1,1,3,3-tetramethylbutylamino(phosphonium ethylenebisthioxanthate, which after trituration with acetone melted at 143° to 150° C. (dec.).

Example 31.—N,N',N",N'"-tetrakis(1,1,3,3-tetramethylbutylamino)phosphonium methylxanthate, which after trituration with ether melted at 152° to 153° C.

Example 32.—Bis - (N,N',N",N'", - tetrakis(1,1,3,3-tetramethylbutylamino)phosphonium ethylenebisxanthate, which after trituration with acetone melted at 139° C. 140° C.

Example 33.—N,N',N",N'"-tetrakis(1,1,3,3-tetramethylbutylamino phosphonium gluconate, which after trituration with ether melted at 88° to 91° C.

Example 34.—N,N',N",N'"-tetrakis(1,1,3,3-tetramethylbutylamino)phosphonium butyl acrylate (61%)-acrylic acid (39%) copolymer carboxylate, which after trituration in benzene melted at 138° to 148° C. (dec.).

Example 35.—N,N',N",N'"-tetrakis(1,1,3,3-tetramethylbutyl)phosphonium butyl acrylate (58%)-methacrylic acid (42%) copolymer carboxylate, which was isolated as an amorphous solid.

Example 36.—N,N',N",N'"-tetrakis(1,1,3,3-tetramethylbutyl)phosphonium butyl acrylate (45%)-α-methyleneglutaric acid (55%) copolymer carboxylate, which was isolated as a gummy solid.

Example 37.—N,N',N",N'"-tetrakis(tert-butylamino)-phosphonium dimethyldithiocarbamate, which after trituration with water melted at 230° C.

Example 38.—N,N',N",N'" - tetrakis(cyclohexylamino)phosphonium methylxanthate, melting at 130° to 131° C.

The compounds of this invention are useful as pesticides and, in particular, as fungicides and bactericides. When so used, the compounds are usually taken up in a carrier or are formulated so as to render them suitable for subsequent dissemination as pesticides. For example, the phosphorimidic triamide salts may be formulated as wettable powders, emulsifiable concentrates, dusts, granular formulations, aerosols, and flowable emulsion concentrates. In such formulations, the compounds are extended with a liquid or solid carrier and, when desired, suitable surfactants are incorporated.

It is usually desirable, particularly in the case of foliar spray formulations, to include adjuvants, such as wetting agents, spreading agents, dispersing agents, stickers and adhesives, and the like, in accordance with usual agricultural practices. Any of the conventional wetting and dispersing agents, particularly cationic and non-ionic types, that are commonly employed in compositions for application to plants can be used. Such surfactants include polyoxyethylated alkyl-phenols, fatty alcohols, fatty acids, mercaptans and alkylamines; polyoxyethylene sorbitan monolaurate, alkyl quaternary ammonium salts, lignin sulfonates, fatty acid alkyd resins and salts of maleic-anhydride-diisobutylene copolymers. In some instances, the cationic phosphorimidic triamide salts may be incompatible with anionic surfactants.

In case the phosphorimidic triamide salt is water-soluble, it may be dissolved directly in water to provide an aqueous spray. Similarly, such compounds may be dissolved in a water-miscible liquid, such as methanol, ethanol, isopropanol, or dimethylformamide or mixtures of these with water, and such solutions extended with water. As a general rule, the phosphorimidic triamide salts are more soluble in polar solvents than in non-polar ones, whereas the reverse is true for the phosphorimidic triamides themselves. In this type of application, the concentration of the phosphorimidic triamide salt may vary from 25% to 98%, with a preferred range being 50% to 95%.

For the preparation of emulsifiable concentrates, the compound may be dissolved in organic solvents, such as xylene, pine oil, orthodichlorobenzene, or methyl oleate, or a mixture of solvents, together with an emulsifying agent which permits dispersion of the pesticide in water. The concentration of the active ingredient in emulsion concentrates is usually 10% to 25% and, in flowable emulsion concentrates, this may be as high as 75%.

Wettable powders, suitable for spraying, may be prepared by admixing the compound with a finely divided solid, such as clays, inorganic silicates and carbonates, and silicas, and incorporating wetting agents, sticking agents, and/or dispersing agents in such mixtures. The concentration of active ingredients in such formulations is usually in the range of 20% to 98%, preferably 40% to 75%. A typical wettable powder formulation may be made by blending 50 parts of a phosphorimidic triamide salt, 40 parts of a hydrated silico aluminate, 5 parts of octylphenoxypolyethoxyethyl ether (Triton X-100) and 5 parts of sodium lignin sulfonate (Marasperse N), then comminuting. Another typical wettable powder may be made by mixing 75 parts of a phosphorimidic triamide salt, 15 parts of an attapulgite clay, 2 parts of a mixture of octylphenoxypolyethoxyethyl ether (40%) and magnesium carbonate (60%), 5 parts of Marasperse N and 3 parts of the sodium salt of a copolymer of maleic anhydride and diisobutylene (Tamol 731), then micropulverizing. A 98% wettable powder may be made by adding 340 parts of a phosphorimidic triamide salt to an aqueous solution containing 7 parts of Triton X-100 so that the resulting slurry is 30% solids. The water is then removed at 105° C. and the resulting solid micropulverized. There may be a tendency to build up charges of static electricity.

Dusts are prepared by mixing the phosphorimidic triamide salts with finely divided inert solids which may be organic or inorganic in nature. Materials useful for this purpose include botanical flours, silicas, silicates, carbonates and clays. One convenient method of preparing a dust is to dilute a wettable powder with a finely divided carrier. Dust concentrates containing 20% to 80% of the active ingredient are commonly made and are subsequently diluted to 1% to 10% use concentration.

The phosphorimidic triamide salts can be applied as fungicidal sprays by methods commonly employed, such as conventional high-gallonage hydraulic sprays, low gallonage sprays, airblast spray, aerial sprays and dusts. The dilution and rate of application will depend upon the type of equipment employed, the method of application and the diseases to be controlled, but the amount is usually 0.1 lb. to 10 lbs. per acre of the active ingredient.

The compounds were evaluated as fungicides in the standard slide spore germination test (cf. Phytopathology, 33, 627 (1943)), utilizing spores of *Alternaria solani*, *Monilinia fructicola* and *Stemphylium sarcinaeforme*. The values obtained for the concentration in parts per million (p.p.m.), which effectively control 50% of the spores ($ED_{50}$), are given in Table I for typical compounds.

TABLE I.—SLIDE SPORE GERMINATION FUNGICIDE TESTS

| Compound of Example | $ED_{50}$ (p.p.m.), Alternaria Solani | Monilinia fructicola | Stemphylium sarcinaeforme |
|---|---|---|---|
| 1 | | | |
| 3 | | | <1,000 |
| 5 | | 10–50 | <1,000 |
| 6 | 50–200 | <1 | 1–10 |
| 7 | | <,1000 | <1,000 |
| 8 | <1,000 | <1,000 | <1,000 |
| 9 | <1 | <1 | <1 |
| 1 | 10–50 | 10–50 | 10–50 |
| 11 | <1 | <1 | 1–10 |
| 12 | 50–200 | 10–50 | 10–50 |
| 13 | | <1,000 | <1,000 |
| 14 | <1,000 | <1,000 | <1,000 |
| 15 | | 50–200 | <1,000 |
| 16 | | <1 | 1–10 |
| 17 | 1–10 | <1 | 1–10 |
| 18 | 1–10 | <1 | 1–10 |
| 29 | | 1–10 | <1 |
| 20 | | <1,000 | <1,000 |
| 21 | <1 | <1 | <1 |
| 22 | <1 | <1 | <1 |
| 23 | 1–10 | <1 | 1–10 |
| 24 | <1 | <1 | <1 |
| 25 | <1 | <1 | 1–10 |
| 26 | <1 | <1 | <1 |
| 27 | 10–50 | <1 | <1 |
| 28 | 1–10 | <1 | 1–10 |
| 29 | 1–10 | <1 | 1–10 |
| 30 | 1–10 | <1 | 1–10 |
| 31 | 1–10 | <1 | <1 |
| 32 | <1 | <1 | 1–10 |
| 33 | <1 | <1 | 1–10 |
| 34 | 1–10 | <1 | 1–10 |
| 35 | 10–50 | <1 | 10–50 |
| 36 | 1–10 | <1 | 1–10 |
| 37 | <1 | 10–50 | 1–10 |
| 83 | 10–50 | <1 | <1 |

The values show that the phosphorimidic triamide salts of this invention have practical and, in many cases, outstanding fungicidal activity. In slide spore germination tests, tetra(aryl)phosphorimidic triamide salts are shown to have essentially no fungicidal activity.

Representative compounds of this invention were evaluated for the control of tomato anthracnose in a persistency type test. In this test, ripe tomatoes are sprayed with a dosage series of the test compound and are then allowed to dry. The sprayed tomatoes are then subjected to a heavy fog overnight. Ten separate drops of an inoculum containing one million spores of *Colletotricum phomoides* per milliliter are spaced on the face of each tomato and the treated fruit placed in a moist chamber at 75° to 80° F. overnight. They are then allowed to stand in a test room held at about 75° F. until lesions appear, usually about three days. Lesions on treated and untreated fruit are counted and the percent control calculated. Table II shows the results.

TABLE II.—TOMATO ANTHRACNOSE PERSISTENCY FUNGICIDE TESTS

| Compound of Example | Percent Control at— | |
|---|---|---|
| | 2 lbs./100 gals. | 0.5 lb./100 gals. |
| 1 | 47 | 47 |
| 3 | 64 | 47 |
| 5 | 67 | 70 |
| 8 | 100 | 100 |
| 22 | 88 | 50 |
| 26 | 100 | 90 |
| 28 | 96 | 60 |
| 30 | 100 | 88 |
| 31 | 100 | 88 |
| 34 | 100 | 88 |
| 37 | 92 | 66 |
| 38 | 80 | 36 |

N,N',N",N'"-tetrakis(1,1,3,3,-tetramethylbutyl) - phosphorimidic triamide hydrochloride was evaluated for its activity in controlling bean anthracnose, a disease caused by the fungus *Colletotricum lindemuthianum*, and was found to give excellent control by using sprays containing as little as 5 p.p.m. Tetra(aryl)phosphorimidic triamide hydrochlorides were found to give no control of this organism.

Thus, representative compounds of this invention will give practical control of anthracnose diseases.

In standardized test procedures, the compounds of

Examples 8, 11 and 27 were found to give good control of tomato late blight caused by *Phytophthora infestans* and of apple scab caused by *Venturia inaequalis*.

In field tests in which the control of tomato early blight (*Alternaria solani*), corn leaf blight (*Helminthosporium spp.*) and broccoli downy mildew (*Peronospora parasitica*) was studied, it was shown that N, N', N", N"'-tetrakis(1,1,3,3 - tetramethylbutyl)phosphorimidic triamide hydrochloride gave excellent control of these diseases at dosages in the range of 0.75 lb. to 3 lbs. per 100 gallons of spray.

In field tests in which the control of celery early blight (*Cercospora apii*) was measured, control of the disease comparable to that obtained with commercial standards was obtained with the compounds of Examples 6 and 8 at dosages as low as 0.75 lb. per 100 gallons.

Representative compounds of this invention were found to give good control of bacterial leaf spot of peppers and tomatoes, caused by the bacterial organisms, *Xanthomonas vesicatoria*. The compounds of Examples 8 and 31 have given at least 75% control of this disease when the chemicals were applied to the plants in an aqueous medium containing 1 lb. of the active ingredient per 100 gallons of spray.

Compounds of this type have also demonstrated good bactericidal activity against representative Gram positive and Gram negative bacteria, although they give best results against the Gram positive ones. In a standard agar streak test wherein the test compounds were incorporated in agar at a concentration of 1:1000, complete control of *Pseudomonas aeruginosa*, *Staphylococcus aureus* and *Eschrichia coli* was obtained with the compounds of Examples 8, 12, 20 and 34.

When the phosphorimidic triamide salts are used as agricultural and horticultural pesticides on living plants, it is preferred that they be relatively non-phytotoxic. The choice of X in the $(RNH)_4P \cdot X$ compounds may, in part, influence the phytotoxicity. It is desirable to choose an anion X which is relatively innocuous. In the case where X represents halides, those halides having an atomic weight of 35 to 127 are used. The preferred compounds are those in which R represents t-alkyl groups, i.e. those compounds in which the attachment of the alkyl group to the nitrogen is through a carbon atom containing no hydrogen. In contradistinction to the phosphorimidic triamide salts of this invention, tetra(aryl)phosphorimidic triamide salts possess considerable phytotoxicity.

The compounds of this invention may be used alone or in combination with other known biologically active materials, such as insecticides, miticides, other fungicides, and the like.

The phosphorimidic triamide salts of this invention are novel compounds. They provide a new class of biologically active structures. These compounds are outstandingly effective fungicides and demonstrate a wide spectrum of activity. They give excellent control of many of the outstanding economic fungal diseases and are relatively non-phytotoxic. They are also effective bactericides and are particularly promising as agricultural bactericides.

We claim:

1. A compound, having pesticidal activity, of the $$(RNH)_4P \cdot X$$

wherein each R is independently selected from the group consisting of alkyl groups of 1 to 18 carbon atoms, alkenyl groups of 3 to 12 carbon atoms and cycloalkyl groups of 5 to 6 carbon atoms and X is a member of the group consisting of borate, bromide, chloride, fluoborate, iodide, nitrate, phosphate, sulfates, acetate, carbonates, oxalate, phthalate, carbamates, dithiocarbamates, sulfonates, thioxanthates, xanthates and polycarboxylate.

2. A compound, having fungicidal activity, according to claim 1 wherein R is a t-alkyl group of 4 to 18 carbon atoms.

3. The compound, having fungicidal activity, N,N',N", N"'-tetrakis(t-octyl)phosphorimidic triamide hydrochloride of the formula $$[(CH_3)_3CCH_2C(CH_3)_2NH]_4P \cdot Cl$$

4. The compound, having fungicidal activity, N,N',N", N"'-tetrakis(t-butyl)phosphorimidic triamide hydrochloride of the formula $$[(CH_3)_3CNH]_4P \cdot Cl$$

5. The compound, having fungicidal activity, N-(t-octyl)-N',N",N"'-(t-butyl)phosphorimidic triamide hydrochloride of the formula $$[(CH_3)_3CCH_2C(CH_3)_2NH][(CH_3)_3CNH]_3P \cdot Cl$$

6. The compound, having fungicidal activity, tetrakis-(cyclohexyl)phosphorimidic triamide hydrochloride of the formula $$(C_6H_{11}NH)_4P \cdot Cl$$

7. The compound, having fungicidal activity, N,N',N", N"'-tetrakis(t-octylamino)phosphonium nitrate of the formula $$[(CH_3)_3CCH_2C(CH_3)_2NH]_4P \cdot NO_3$$

8. The process of making a phosphorimidic triamide hydrochloride of the formula $$(RNH)_4P \cdot Cl$$

wherein R is selected from the group consisting of alkyl groups of 1 to 18 carbon atoms, alkenyl groups of 3 to 12 carbon atoms and cycloalkyl groups of 5 to 6 carbon atoms, which consists of reacting under substantially anhydrous conditions at a temperature in the range of 20° to 140° C. a phosphorimidic diamide hydrochloride of the formula $$(RNH)_3PCl_2$$

with 4 to 25 mole equivalents of a primary amine, $RNH_2$, wherein R, in each instance, is as defined above, whereby said phosphorimidic triamide hydrochloride is produced.

9. A process as claimed in claim 8 wherein there is added the step of reacting the said phosphorimidic triamide hydrochloride of the formula $(RNH)_4P \cdot Cl$ with a member of the group consisting of acids of the formula HX and alkali metal, alkaline earth metal, silver and lead salts thereof, wherein X is a salt-forming anion other than chloride.

10. A process in accordance with the conditions of claim 8 for preparing the compound, $$[(CH_3)_3CCH_2C(CH_3)_2NH][(CH_3)_3CNH]_3P \cdot Cl$$

which consists of reacting t-octylamine with chloro-N,N', N"-tris(t-butyl)phosphorimidic diamide hydrochloride.

References Cited

UNITED STATES PATENTS

| | | | |
|---|---|---|---|
| 2,407,161 | 9/1946 | Kaiser et al. | 260—551 |
| 2,438,124 | 3/1948 | Lecher et al. | 260—551 |
| 2,818,366 | 12/1957 | Birum | 167—22 |
| 2,906,661 | 9/1959 | Baker | 167—22 |
| 2,828,195 | 3/1958 | Yust et al. | 260—606.5 |

OTHER REFERENCES

Conant, Chemistry of Organic Compounds, p. 373 (1939).

Houben Weyl, Methoden der Organischen Chemie, Band X11/1, pp 132–33 and 175–6, (1963).

Kosolapoff, Organophosphorous Compounds, pp. 325–32 (1950).

Michaelis, Annalen der Chemie, 326, p. 140 (1903).

JOHN D. RANDOLPH, *Primary Examiner.*

H. MOATZ, *Assistant Examiner.*